United States Patent [19]

Tanaka et al.

[11] Patent Number: 5,338,350
[45] Date of Patent: Aug. 16, 1994

[54] INK COMPOSITION FOR FORMING THIN FILM

[75] Inventors: Katsuto Tanaka, Matsusaka; Kensuke Makita, Ichishi; Yasuo Moriguchi, Matsusaka, all of Japan

[73] Assignee: Central Glass Company, Limited, Ube, Japan

[21] Appl. No.: 85,786

[22] Filed: Jul. 6, 1993

[30] Foreign Application Priority Data

Jul. 6, 1992 [JP] Japan .................................. 4-178629

[51] Int. Cl.$^5$ ............................................ C09D 11/00
[52] U.S. Cl. ........................ 106/19 D; 106/19 C; 106/26 A; 106/287.19
[58] Field of Search ............... 106/19 C, 19 D, 26 A, 106/287.19; 501/12

[56] References Cited

U.S. PATENT DOCUMENTS

| | | | |
|---|---|---|---|
| 4,361,598 | 11/1982 | Yoldas | 106/287.19 |
| 4,411,703 | 10/1983 | Whitehouse | 106/287.19 |
| 4,579,594 | 4/1986 | Nanao et al. | 106/287.19 |
| 4,908,065 | 3/1990 | Tanitsu et al. | 106/287.19 |
| 5,108,479 | 4/1992 | Hirano | 65/60.52 |
| 5,250,322 | 10/1993 | Takahashi et al. | 501/12 |
| 5,262,362 | 11/1993 | Covino-Hrbacek | 106/287.19 |

FOREIGN PATENT DOCUMENTS

| | | |
|---|---|---|
| 63-48372 | 3/1988 | Japan . |
| 64-56776 | 3/1989 | Japan . |
| 2-60974 | 3/1990 | Japan . |

*Primary Examiner*—Helene Klemanski
*Attorney, Agent, or Firm*—Keck, Mahin & Cate

[57] ABSTRACT

An ink composition for forming a thin metal oxide film contains a glass component, a viscosity-increasing agent and a solvent. The glass component is one of a halogen-containing metal alkoxide, a mixture of the halogen-containing metal alkoxide and another metal alkoxide, and a mixture of the halogen-containing metal alkoxide and a metal oxide sol. The viscosity-increasing agent is nitrocellulose H60 according to Japanese Industrial Standard K6703. The solvent is at least one of ethylcarbitol and butylcarbitol. The formed thin metal oxide film is superior in transparency, abrasion resistance and scratch resistance.

7 Claims, No Drawings

INK COMPOSITION FOR FORMING THIN FILM

BACKGROUND OF THE INVENTION

This invention relates to an ink composition for forming a thin metal oxide film on a glass substrate.

It is known to form a thin metal oxide film on a substrate with an ink containing a base metal compound such as metal oxide hydrate or a metal alkoxide, a binder such as a resin, a solvent and other additives such as a pigment and the like.

For example, JP-A-63-48372 discloses an ink composition containing an organic coloring material, a binder such as a silicon alkoxide, and a solvent such as an alkyl alcohol.

JP-A-64-56776 discloses a heat-resistant ink for an ink jet printer. This ink contains a hydrolyzed metal alkoxide in the form of solid, a solvent, a binder and an electric conductivity imparting agent.

JP-A-2-60974 discloses an ink composition containing a compound containing a base metal such as a metal alkoxide, abietic acid as a viscosity-increasing agent, and a solvent such as butyl carbitol.

It is known to form a thin film on a substrate by screen printing, gravure, intaglio printing, stamping or spraying. For example, U.S. Pat. No. 5,108,479 discloses a method for forming a functional film on a glass plate by screen printing with an ink composition containing a metal alkoxide and a viscosity-increasing agent such as ethyl cellulose or nitrocellulose.

However, as is mentioned hereinabove, when a metal alkoxide is contained in an ink composition, it is necessary to hydrolyze the metal alkoxide to form a sol through polycondensation. With this, viscosity of the ink tends to change and its pot life tends to be shortened. When a conventional cellulose type viscosity-increasing agent is contained in an ink, a large amount of carbon tends to remain in a thin film even after drying and baking of the thin film. Therefore, the thin film tends to have a yellowish brown color damaging its external appearance. Furthermore, its strength such as scratch resistance tends to be substantially lowered.

SUMMARY OF THE INVENTION

It is therefore an object of the present invention to provide an ink composition which is prolonged in pot life, for forming a thin film which is uniform in thickness, colorless and excellent in abrasion resistance, scratch resistance and durability.

The present invention provides an ink composition for forming a thin metal film, comprising:
- one selected from the group consisting of a halogen-containing metal alkoxide, a mixture of said halogen-containing metal alkoxide and another metal alkoxide, and a mixture of said halogen-containing metal alkoxide and a metal oxide sol;
- nitrocellulose H60 according to Japanese Industrial Standard K 6703; and
- at least one selected from the group consisting of ethylcarbitol and butylcarbitol.

DESCRIPTION OF THE PREFERRED EMBODIMENTS

An ink composition according to the present invention comprises, as a glass component, a halogen-containing metal alkoxide, a first mixture of the halogen-containing metal alkoxide and another metal alkoxide, or a second mixture of the halogen-containing metal alkoxide and a metal oxide sol.

The halogen-containing metal alkoxide is used as an example of the glass component because the halogen-containing metal alkoxide solution is not hydrolyzed even if a small amount of water is added thereto. This occurs due to peptization. Thus, pot life of the ink composition is prolonged. However, when the ink is applied to a substrate so as to form thereon a thin film having a large surface area, contact area between the ink and the atmosphere is greatly increased. Due to this, the halogen-containing metal alkoxide is hydrolyzed by moisture in the atmosphere. With this, a thin gel film is formed.

The first mixture of the halogen-containing metal alkoxide and the another metal alkoxide or the second mixture of the halogen-containing metal alkoxide and the metal oxide sol are used as examples of the glass component. Due to the use of the metal alkoxide containing a halogen such as chlorine in the first or second mixture, it is not necessary to add water and a catalyst to the first or second mixture to form a sol. Therefore, pot life of the ink composition is prolonged.

Examples of the another metal alkoxides are silicon tetraethoxide, titanium tetraisopropoxide and zirconium isobutoxide. Examples of the metal oxide sols are silica sol and titanium oxide sol.

An ink composition according to the present invention further comprises nitrocellulose H60 according to Japanese Industrial Standard (JIS) K6703 as a viscosity-increasing agent. By the use of a small amount of nitrocellulose H60, viscosity of the ink composition can be efficiently increased. Due to the use of a small amount of nitrocellulose H60, the amount of carbon residue in the baked film is substantially decreased. Therefore, the film is substantially high in strength such as abrasion resistance and scratch resistance. As compared with other common viscosity-increasing agents such as hydroxypropyl cellulose and ethyl cellulose, nitrocellulose H60 does not become an obstacle in printing.

An ink composition according to the present invention still further comprises, as a solvent, ethylcarbitol, butylcarbitol or a mixture of these compounds. Due to the use of ethylcarbitol, butylcarbitol or a mixture of these compounds, drastic drying of the ink composition before printing can be prevented and the printed film can be dried at a relatively low temperature such as about 200° C. Therefore, pot life of the ink composition is prolonged. The above-mentioned halogen-containing metal alkoxide comprises at least one selected from the group consisting of Ti, Zr, Sn, In and Ta. Therefore, a non-selective reflection-increasing metal oxide film which is superior in strength and optical characteristics such as transparency can be obtained.

The most preferable example of the halogen of the halogen-containing metal alkoxide is chlorine. Chlorides are cheap in price and very common as a raw material to synthesize an alkoxide. In the case of salts other than chlorides, it is difficult to separate an alkoxide from a solvent with using solubility difference. For example, many of fluorides or bromides exist in the form of salt hydrate. Therefore, water tends to remain in the alkoxide. On the other hand, chlorides have anhydrous salts.

An ink composition according to the present invention contains 1.0–2.0 wt %, converted in terms of the metal oxide, of a first mixture of the halogen-containing alkoxide and the another metal alkoxide or of a second mixture of the halogen-containing alkoxide and the metal oxide sol. If the content is less than 1.0 wt %, the film thickness becomes too thin and uneven. With this, the external appearance of the film is damaged, and desired refractive index, reflection characteristics and transmission characteristics can not be obtained. If the content is higher than 2.0 wt %, the film thickness becomes too thick. In particular, if the film thickness is 150 nm or more, cracks tend to occur in the film. Therefore, the film strength is lowered. When the content is adjusted to 1.0-2.0 wt %, the film thickness becomes uniform and cracks do not occur in the film even if screen-printing, gravure or intaglio printing which makes the film thickness relatively thick is taken.

An ink composition according to the present invention contains 5-10 wt % of nitrocellulose H60. If the content is less than 5 wt %, viscosity of the ink composition becomes insufficient. If the content is higher than 10 wt %, viscosity of the ink composition becomes too thick. With this, for example, a screen tends to be clogged, and it takes too much time to prepare the ink composition and to wash a printer, a screen and the like, thereby lowering the efficiency of the printing. When the content is adjusted to 5-10 wt %, the prepared ink composition will have a viscosity ranging from 20 to 100 ps. This range is suitable for screen printing, gravure, intaglio printing and the like.

In case that nitrocellulose H$\frac{1}{2}$ is used, it is necessary to add a large amount of the same to increase viscosity to a certain desired level. With this, the cost to prepare the ink composition increases. Furthermore, if the baking is conducted at a temperature not higher than about 500° C., carbon tends to remain in the film, and the film tends to have yellowish tint and to be insufficient in strength.

An ink composition according to the present invention is suitable to be applied to various kinds of plate glass, and particularly to the automotive window glass.

The present invention will be illustrated with reference to the following nonlimitative examples.

EXAMPLE 1

Chlorine-containing metal alkoxide, $Ti(OC_3H_7)_xCl_y$ (x+y=4), which has a solute concentration of about 1.5 mol/l was prepared by reacting titanium tetrachloride with isopropyl alcohol. About 7.94 g of the acid chlorine-containing metal alkoxide was mixed with about 17.85 g of acid silica sol having a solute concentration of about 0.3 mol/l so as to form a mixed alkoxide solution. A molar ratio of $TiO_2$ to $SiO_2$ in the mixed alkoxide solution was 65 to 35. The mixed alkoxide solution was mixed with about 8 g of nitrocellulose H60 and about 66.21 g of ethylcarbitol, and the mixture was stirred for about 1 hr with a propeller-type stirrer at a temperature of about 50° C. so as to obtain an ink according to the present invention. The ink containing about 8 wt % of nitrocellulose H60 had a viscosity of about 23.2 ps. After 3 days, it increased to about 32.1 ps. Then, the viscosity was stable. After 7 days, it was 32.3 ps. Then, the ink was applied to a glass substrate by screen printing with a Tetoron (trademark) screen having a mesh size of 380 so as to form a thin film thereon. The printed film was baked at a temperature of about 600° C. for about 10 min. With this, a thin film of $TiO_2$ and $SiO_2$ was obtained. The film had a thickness of about 70 nm and a refractive index of about 1.9 and was silver in color, half-mirrorlike, transparent and uniform in composition. The thus obtained film was sufficient in strength. The film was subjected to Taber abrasion test according to JIS R3212. In this test, after 100 rolling abrasion with a load of about 500 g, the increase of haze was about 1%.

EXAMPLE 2

An ink according to Example 1 was applied to a glass substrate by intaglio stamping so as to form a thin film thereon. Then, the film was baked for about 20 min at a temperature of about 500° C. With this, a thin film of $TiO_2$ and $SiO_2$ was obtained. The film was silver in color and had a thickness of about 50 to about 60 nm. Characteristics of the film were similar to those of the film of Example 1.

EXAMPLE 3

Similar to Example 1, chlorine-containing zirconium alkoxide having a solute concentration of about 1.45 mol/l was prepared with using zirconium tetrachloride. Similar to Example 1, this alkoxide was mixed with nitrocellulose and ethylcarbitol so as to form an ink. Viscosity of the ink was very stable during storage. In two weeks after the preparation of the ink, the increase of viscosity was only about 35% of the initial viscosity. The ink was applied to a glass substrate having a thickness of about 3 mm with using a gravure roll coater so as to form a thin film thereon. The film was baked at a temperature of about 550° C. for about 15 min. The baked film was silver in color and had a thickness of about 90 nm and a refractive index of about 1.93. Characteristics of the film were similar to those of the film of Example 1

In the present invention, various printing processes can be taken. It is needless to say that viscosity is adjusted in accordance with the type of printing process.

COMPARATIVE EXAMPLE 1

Example 1 was repeated except in that 14 g of nitrocellulose H60 and about 60.21 g of ethylcarbitol were used so as to form an ink containing 14 wt % of nitrocellulose H60 and having a viscosity of about 83 ps. Similar to Example 1, the ink was applied to a glass substrate, and a thus formed film was baked. The baked film was silver in color and half-mirrorlike. However, the film was not uniform in composition. The film was uneven in thickness. Viscosity of the ink was unstable. That is, in one day after the preparation of the ink, viscosity increased to about 120 ps. Furthermore, a screen was easily clogged during printing.

COMPARATIVE EXAMPLE 2

Example 1 was modified in that nitrocellulose H$\frac{1}{2}$ was used instead of nitrocellulose H60. Furthermore, the amount of nitrocellulose H$\frac{1}{2}$ was about 5.5 times as that of nitrocellulose H60 of Example 1 so as to obtain an ink having a viscosity of about 23 ps which is similar to the ink of Example 1. The stirring was conducted for about 3 hr or more to obtain a uniform ink. The ink was applied to a glass substrate by screen printing with using a Tetoron (trademark) screen having a mesh size of 350 so as to form B thin film thereon. The film was baked at a temperature of about 450° C. The baked oxide film had a silver color having pale yellow tint and was relatively uniform in composition. However, the film was somewhat inferior in abrasion resistance.

COMPARATIVE EXAMPLE 3

Example 1 was modified in that ethyl cellulose was used instead of nitrocellulose H60. The amount of ethyl cellulose was almost the same as that of nitrocellulose H60 of Example 1. The ink had a viscosity ranging from about 25 to about 30 ps. Similar to Example 1, the ink was applied to a glass substrate by screen printing so as to form a thin film. Then, the film was baked at a temperature of about 600° C. The baked film was substantially weak in strength. After Taber abrasion test, a portion of the film peeled off from the glass substrate. A large amount of carbon residue was detected in the baked film by elemental analysis through Auger electron spectroscopy.

What is claimed is:

1. An ink composition for forming a thin metal film, comprising:
   one selected from the group consisting of a halogen-containing metal alkoxide, a mixture of said halogen-containing metal alkoxide and another metal alkoxide, and a mixture of said halogen-containing metal alkoxide and a metal oxide sol;
   nitrocellulose and
   at least one selected from the group consisting of ethylcarbitol and butylcarbitol.

2. An ink composition according to claim 1, wherein metal of said halogen-containing metal alkoxide is at least one selected from the group consisting of Ti, Zr, Sn, In and Ta.

3. An ink composition according to claim 1, wherein halogen of said halogen-containing metal alkoxide is chlorine.

4. An ink composition according to claim 1, wherein the content of the mixture of said halogen-containing metal alkoxide and said another metal alkoxide or of the mixture of said halogen-containing metal alkoxide and said metal oxide sol in the ink composition is from 1.0 to 2.0 wt %, converted in terms of metal oxide.

5. An ink composition according to claim 1, wherein the content of said nitrocellulose H60 in the ink composition is from 5 to 10 wt %.

6. An ink composition according to claim 1, wherein said another metal alkoxide is one selected from the group consisting of silicon tetraethoxide, titanium tetraisopropoxide and zirconium isobutoxide.

7. An ink composition according to claim 1, wherein said metal oxide sol is one selected from the group consisting of silica sol and titanium oxide sol.

* * * * *